(12) United States Patent
Eriksson et al.

(10) Patent No.: US 11,144,040 B2
(45) Date of Patent: Oct. 12, 2021

(54) METHOD FOR ESTIMATING ERROR PROPAGATION

(71) Applicant: SANDVIK INTELLECTUAL PROPERTY AB, Sandviken (SE)

(72) Inventors: Peter Eriksson, Sandviken (SE); Vahid Kalhori, Gavle (SE); Martin Helgoson, Gavle (SE); Anders Ivarsson, Storvik (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 16/332,347

(22) PCT Filed: Aug. 16, 2017

(86) PCT No.: PCT/EP2017/070752
§ 371 (c)(1),
(2) Date: Mar. 11, 2019

(87) PCT Pub. No.: WO2018/046261
PCT Pub. Date: Mar. 15, 2018

(65) Prior Publication Data
US 2019/0212720 A1     Jul. 11, 2019

(30) Foreign Application Priority Data

Sep. 12, 2016  (EP) .................................... 16188298

(51) Int. Cl.
*G05B 23/02*     (2006.01)
*G05B 19/418*    (2006.01)

(52) U.S. Cl.
CPC ... *G05B 19/41875* (2013.01); *G05B 23/0221* (2013.01); *G05B 23/0294* (2013.01)

(58) Field of Classification Search
CPC .... G05B 19/41865; G05B 2219/31376; G05B 2219/45031; G05B 2219/50386; Y02P 90/02
See application file for complete search history.

(56) References Cited

U.S. PATENT DOCUMENTS

2017/0308057 A1* 10/2017 Kreidler ............. G05B 19/4069

FOREIGN PATENT DOCUMENTS

| JP | 2008542888 A | 11/2008 |
| JP | 2015109081 A | 6/2015 |
| WO | 2016065492 A1 | 5/2016 |

OTHER PUBLICATIONS

Altintas Y et al: "Virtual Machine Tool", CIRP Annals, Elsevier BV, NL, CH, FR, vol. 54, No. 2, Jan. 1, 2005 pp. 115-138.

* cited by examiner

*Primary Examiner* — Gary Collins
(74) *Attorney, Agent, or Firm* — Corinne R. Gorski (57) ABSTRACT

A computer program includes data defining tool paths for manufacturing a component. The component geometry is estimated based on the program. Deviation of a first type is estimated as deviation between the estimated geometry and geometry of the component as defined by a 3D model. Deviation of a second type is estimated, based on machining process characteristics indicated by sensor data captured during manufacturing of the component, as deviation between a tool path a machine is instructed via the program to provide and an actual tool path provided by the machine. Deviation of a third type is computed as deviation between geometry defined by the 3D model and measured geometry of the manufactured component. An error propagation model is updated based on the estimated and computed deviations for multiple components. The error propagation
(Continued)

model approximates relations between deviations of the first and second type and deviations of the third type.

13 Claims, 4 Drawing Sheets

METHOD FOR ESTIMATING ERROR PROPAGATION

RELATED APPLICATION DATA

This application is a § 371 National Stage Application of PCT International Application No. PCT/EP2017/070752 filed Aug. 16, 2017 claiming priority to EP 16188298.0 filed Sep. 12, 2016.

TECHNICAL FIELD

The present disclosure generally relates to machining, and in particular to process planning and monitoring of machining operations.

BACKGROUND

Components are often manufactured based on a computer-aided design (CAD) model of the component. Subtractive manufacturing includes machining operations such as cutting, drilling, milling, turning, reaming, threading or grinding. Computer-aided manufacturing (CAM) is typically employed to generate tool paths to be used during machining to cut away material from a work piece.

Quality and precision of the manufactured components, manufacturing times, and wear on the cutting tools depend may depend on many factors. Such factors may include decisions made during the pre-machining stage, such as selection of suitable machining operations, cutting tools, and cutting data. Other factors may be conditions arising during the actual machining, such as tool breakage, vibrations, chatter.

The interaction of all these factors may be complex and difficult to predict in detail. However, it may be desirable to find ways to prevent or detect conditions where the machining precision may drop, or where the surface quality of the manufactured product may be too low. It may also be desirable to prevent or detect conditions where the risk of tool breakage is high. If the quality of a manufactured component is too low, it may also be desirable to detect the cause of this low quality, so that the cause may be addressed.

SUMMARY

To better address at least one of the abovementioned issues, method, systems and computer program products are provided.

Hence, according to a first aspect, a method is provided. The method comprises, for each of a plurality of components to be manufactured:

obtaining a three-dimensional model of the component to be manufactured;

obtaining a computer program for manufacture of the component, the computer program including data defining a tool path for a cutting tool;

providing a first estimated geometry by estimating, based on the computer program, a geometry of the component to be manufactured;

estimating a first type of deviation as a deviation between the first estimated geometry and a geometry of the component as defined by the three-dimensional model;

obtaining sensor data captured (or collected) at a machine during manufacturing of the component by the machine, wherein the manufacturing of the component is based on the computer program;

estimating, based on machining process characteristics indicated by the sensor data, a second type of deviation as a deviation between a tool path the machine is instructed via said computer program to provide and an actual tool path provided by the machine during the manufacturing of the component; and computing a deviation of a third type as a deviation between the geometry of the component as defined by the three-dimensional model and a measured actual geometry of the component as manufactured.

The method further comprises updating an error propagation model based on the estimated deviations and the computed deviations. The error propagation model approximates a relation between the first and third types of deviations, and a relation between the second and third types of deviations.

The computer program for manufacturing a component may for example have been generated based on the three-dimensional model (3D model) of the component. The computer program may have been generated based on a machining strategy which may be based on a number of assumptions regarding suitable cutting tools, tool paths and cutting data. The first type of deviation may be indicative of deviations from the 3D model caused by such assumptions, and/or caused by limitations such as precision etc. in software employed to generate the computer program.

Knowledge of relations (or dependencies) between the different types of deviations (as provided by the error propagation model) may for example facilitate detection or prediction of reduced machining precision or other undesirable events. Knowledge of relations (or dependencies) between the different types of deviations (as provided by the error propagation model) may for example facilitate detection of a root cause of an undesirable event (such as the geometry of the manufactured product not being within a given tolerance) once such an undesirable event has been detected. By updating the error propagation model based on the estimated deviations and the computed deviations for a large set of components, the accuracy (or reliability) of the error propagation model may increase over time.

The three-dimensional model (or 3D model) may for example be a digital model, for example a computer-aided design model (or CAD model). The 3D model may for example include embedded information regarding quality requirements and related blank.

It will be appreciated that the plurality of components may for example manufactured based on the same 3D model, and that there may be no need to generate this 3D model once for each of the components. The 3D model may for example be received or retried from a memory.

The computer program may for example include tool path data which is machine independent (such as data on a file with extension .cl) and which needs to be converted to (or post-processed into) numerical control code (NC code) before it can be executed by a computer numerical control (CNC) based machine. The computer program may for example be an NC program which has been obtained via post-processing of a machine-independent data format.

The computer program may for example be generated based on the 3D model, or may be received or retrieved from a memory.

The computer program may for example include data defining a machining operation, an operation sequence, and/or cutting data associated with the tool path.

It will be appreciated that a geometry of a component may include features such as a shape, a size (or dimension), and/or a surface roughness of the component.

The first estimated geometry may for example be obtained by estimating a geometry of the component based on tool paths defined by the computer program.

The machining process characteristics may for example include a machine condition, machine kinematics, machining dynamics, and/or static or dynamic cutting tool process characteristics.

According to some embodiments, the method may further comprise, for at least some of the plurality of components:
 obtaining a post-processed version of the computer program,
 providing a second estimated geometry by estimating, based on the post-processed version of the computer program, a geometry of the component to be manufactured; and
 estimating a fourth type of deviation as a deviation between the first estimated geometry and the second estimated geometry.

The second type of deviation may be estimated, based on the machining process characteristics, as a deviation between a tool path the machine is instructed via the post-processed version of the computer program (and thereby indirectly via the computer program) to provide and an actual tool path provided by the machine during the manufacturing of the component. The error propagation model may be updated also based on the estimated deviations of the fourth type. The error propagation model may also approximate a relation between the fourth and third types of deviation.

The post-processed version of the computer program may for example have been obtained by post-processing the computer program. Such post-processing may be based on assumptions regarding the particular control system intended to execute the computer program. The fourth type of deviation may be indicative of deviations relating to the particular type of control system and/or the precision of the post processing (e.g. the interpolation and/or extrapolation employed).

The post-processed version of the computer program may for example be obtained by actually post-processing the computer program, or by retrieving the post-processed version of the computer program from a memory.

The second estimated geometry may for example be obtained by estimating a geometry of the component based on tool paths defined by the post processed version of the computer program.

According to some embodiments, the obtained sensor data may include positional feedback from a control system controlling the machine (directly or indirectly) based on the computer program.

Motions actually provided in the machine during machining may deviate somewhat from motions required to provide tool paths indicated in the computer program. Positional feedback from the control system may be employed to detect such deviations.

The control system may for example include (or be provided in the form of) a programmable logic controller (PLC).

According to some embodiments, the obtained sensor data may include sensor data from a cutting tool (for example arranged in the machine). The machining process characteristics may include deflection of the cutting tool, vibration of the cutting tool, temperature expansion of the cutting tool, wear (for example wear of the cutting tool); tool breakage; and/or chip breakage. Sensor data from the cutting tool may for example be employed to estimate such machining process characteristics.

According to some embodiments, the obtained sensor data may include sensor data from other parts of the machine than the cutting tool. The machining process characteristics may include a loose connection (or play) between parts of the machine, and/or a certain level of friction for a movable part of the machine.

According to some embodiments, the obtained sensor data may include data from a dynamic force measurement sensor (for example an accelerometer or a dynamometer), a force measurement sensor, a torque measurement sensor, a temperature sensor, a dimensional measurement sensor, a surface roughness measurement sensor, a positioning sensor, an inductive sensor, and/or an optical sensor.

According to some embodiments, the method may further comprise, after updating the error propagation model:
 obtaining a three-dimensional model of an additional component to be manufactured;
 obtaining a computer program for manufacture of the additional component, the computer program including data defining a tool path for a cutting;
 providing an estimated geometry of the additional component by estimating, based on the computer program, a geometry of the additional component to be manufactured;
 estimating a first type of deviation between the estimated geometry of the additional component and a geometry of the additional component as defined by the three-dimensional model of the additional component;
 obtaining additional sensor data captured at a machine during manufacture of the additional component by the machine, wherein the additional component is manufactured by the machine based on the computer program;
 estimating, based on a machining process characteristic indicated by the additional sensor data, a second type of deviation as a deviation between a tool path the machine is instructed via the computer program to provide and an actual tool path provided by the machine during manufacture of the additional component; and
 estimating, based on the error propagation model and based on the estimated deviations for the additional component, a deviation between the geometry of the additional component as defined by the three-dimensional model and an actual shape of the additional component as manufactured.

Since the deviation between the geometry of the additional component as defined by the three-dimensional model and the actual shape of the additional component as manufactured may be estimated, measurements for assessing quality of the additional component as manufactured may for example be dispensed with or may be simplified (or the number of measurements may be reduced). The overall production time and/or production cost may therefore be reduced.

According to some embodiments, the method may comprise, after updating the error propagation model:
 obtaining a three-dimensional model of an additional component to be manufactured;
 obtaining a computer program for manufacture of the additional component, the computer program including data defining a tool path for a cutting tool;
 providing an estimated geometry of the additional component by estimating, based on the computer program, a geometry of the additional component to be manufactured;

estimating a first type of deviation between the estimated geometry of the additional component and a geometry of the additional component as defined by the three-dimensional model of the additional component;

obtaining additional sensor data captured at a machine during manufacture of the additional component by the machine, wherein the additional component is manufactured by the machine based on the computer program;

estimating, based on machining process characteristics indicated by the additional sensor data, a second type of deviation as a deviation between a tool path the machine is instructed via the computer program to provide and an actual tool path provided by the machine during manufacture of the additional component; and providing documentation, including the estimated deviations for the additional component, for delivery together with (or to be delivered together with) the additional component.

The documentation may be employed to evaluate the component (for example a quality or surface structure of the component), and/or to locate a portion of the component where the shape or surface structure of the component is likely to be lower than usual. The documentation may for example be employed to identify a root cause for a deviation detected at the component as manufactured.

The documentation may for example be provided in the form data (for example in a digital document or data file), or in the form of a paper document. The documentation may for example be delivered over the internet.

The documentation may for example include some of all of the additional sensor data. The documentation may for example include the error propagation model.

According to some embodiments, the method may comprise generating instructions, based on the updated error propagation model or based on the estimated deviations and the computed deviations, for selection of:

a machining operation,
a machining operation sequence;
a cutting tool,
a tool assembly;
a tool path; and/or
cutting data, in a process for generating, based on a three-dimensional model of a component, a computer program for manufacturing of the component. In other words, settings for how to perform pre-machining (or process planning) may be adjusted (or modified) based on the updated error propagation model or based on the estimated deviations and the computed deviations.

For example, the instructions may indicate how to select an optimized machining operation, an optimized cutting tool and tool assembly selection, and/or an optimized operation sequence and cutting data selection.

The computer program may for example be an NC program, or a machine-independent program which has to be post-processed before being executed by a CNC based machine.

According to some embodiments, the method may comprise generating, based on the sensor data captured at a machine during manufacturing of a certain component by the machine, control signals for controlling the machine to adjust cutting data (for example feed rate or spindle speed) already during the manufacture of the certain component.

According to some embodiments, the method may comprise generating, based on the sensor data captured at a machine during manufacturing of a certain component by the machine, instructions for controlling the machine to adjust cutting data (for example feed rate or spindle speed) for manufacture of a subsequent component.

According to some embodiments, the method may comprise updating, based on the updated error propagation model or based on the estimated deviations and the computed deviations, a rule (or a model, such as a statistical model, a numerical model or a mechanical model) for how sensor data captured at a machine during manufacture of a component by the machine is to be employed for control of the machine during manufacture (or during machining).

A model (for example a statistical model) may for example be employed to model the machining process (or the cutting process). That model may be for example be employed for controlling the machine during manufacture (or during machining) based on the sensor data. The model may for example be updated based on the updated error propagation model or based on the estimated deviations and the computed deviations.

According to a second aspect, there is provided computer program product comprising a computer-readable medium with instructions for performing the method according to any embodiment of the first aspect.

The advantages presented above for features of methods, according to the first aspect, may generally be valid for the corresponding features of computer program products according to the second aspect.

The computer-readable medium may for example be a transitory or non-transitory computer-readable medium.

According to a third aspect, there is provided a system configured to perform the method as according to any embodiment of the first aspect.

The advantages presented above for features of methods, according to the first aspect, may generally be valid for the corresponding features of systems according to the third aspect.

The system may for example comprise a processing section (or processor) configured to perform the method. The system may for example include multiple processing sections configured to perform the method in a distributed fashion.

It is noted that embodiments of the present disclosure relate to all possible combinations of features recited in the claims.

BRIEF DESCRIPTION OF THE DRAWINGS

In what follows, example embodiments will be described in greater detail and with reference to the accompanying drawings, on which.

All the figures are schematic and generally only show parts which are necessary in order to elucidate the respective embodiments, whereas other parts may be omitted or merely suggested.

DETAILED DESCRIPTION

Figure 1:
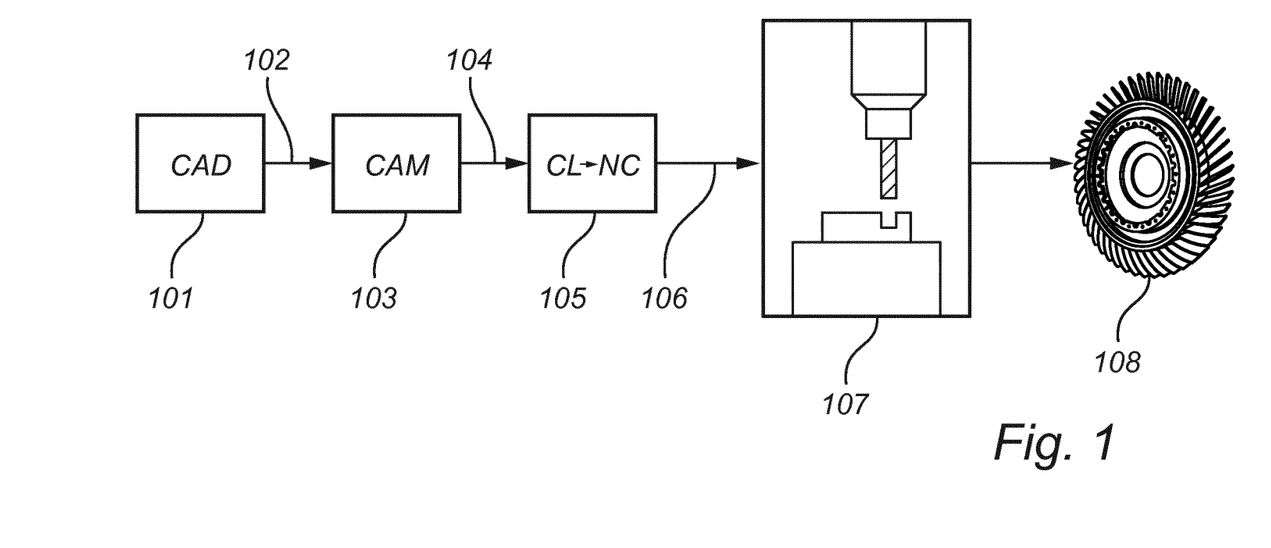
FIG. 1 is an overview of how a component may be manufactured based on a computer model of the component.

FIG. 1 is an overview of how a component may be manufactured based on a computer model of the component.

The component to be manufactured is designed 101 on a computer using computer-aided design (CAD). A 3D model 102 of the component is thereby obtained. The 3D model is a digital model defining shape and dimension of the component, as well as other information such as tolerances and quality requirements. Computer-aided manufacturing (CAM) 103 is then employed to generate tool paths for manufacturing the component from a work piece via metal cutting. Tool path data 104 obtained via the CAM 103 may for example be stored as a computer program 104 with file extension .cl. The tool path data 104 may for example define a series of milling or turning operations using certain cutting tools and certain cutting data (for example cutting speed and feed rate). The result of the CAM 103 is then converted 105 to a language 106 employed by the control system (or programmable logic controller, PLC) of the machine 107 in which the component is to be manufactured. This conversion 105 is called post-processing 105. The result of the post-processing 105 may be numerical control (NC) code 106 suitable for a machine 107 using computer numerical control (CNC). Based on the NC program 106, the control system (or PLC) controls servos of the machine 107 to move a cutting tool relative to a work piece. A cutting edge of the cutting tool cuts away material from the work piece so as to form the component 108. The work piece from which the component 108 is manufactured may for example comprise metal such as steel or aluminum. The cutting edge employed for the metal cutting may for example comprise cemented carbide. In the present example, the manufactured component is a bladed disk 108.

Several factors in the above described process may cause deviations between the CAD model 102 of the component and the actual component 108 obtained via the manufacturing. Depending on various assumptions, approximations and/or limitations associated with the various steps described above, errors or deviations may arise. The deviations considered in the present disclosure include for example:

- deviation caused when generating a CAM program 104 based on the CAD model 102;
- deviation caused during post processing 105;
- deviation caused by the fact that motion provided by a PLC via servos of the machine 107 may not agree with motion specified by the NC code 106; and
- deviation caused by events at the cutting of the machine 107 tool (such as deflection, vibration, temperature expansion, etc).

Figure 2:
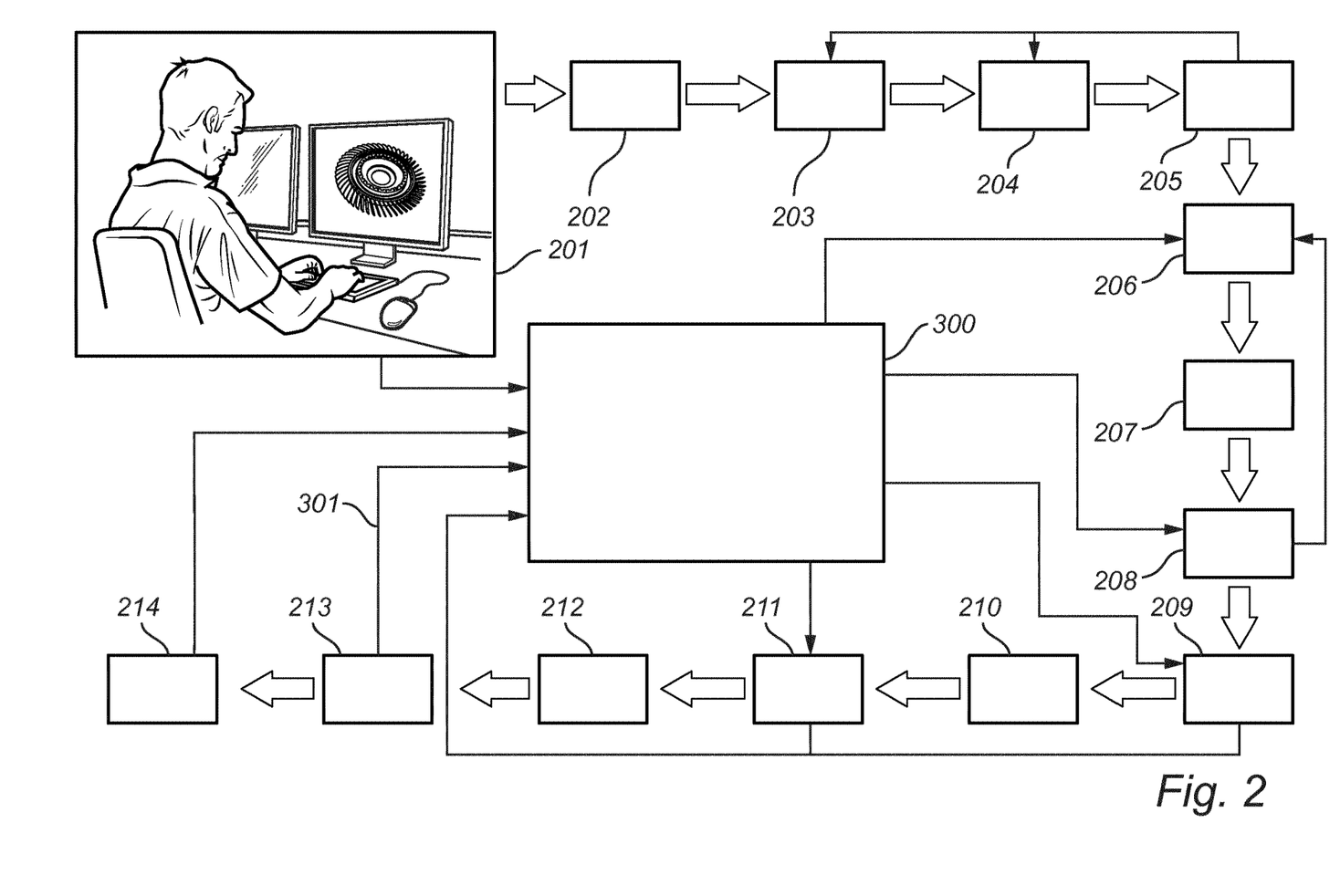
FIG. 2 is an overview of feedback and control during process planning and manufacturing of a component, according to an embodiment.

FIG. 2 is an overview of feedback and control during process planning and manufacturing of a component, according to an embodiment. Before a component is manufactured, a 3D model of the component is first generated 201 in a computer, for example using CAD software. The component may for example comprise metal such as steel or aluminum. A machine suitable for manufacturing the component is then determined (or selected) 202. The machine may for example be adapted to manufacture the component from a work piece via subtractive manufacturing such as cutting, drilling, milling, turning, reaming, threading or grinding. Once a machine has been selected 202, suitable machining operations for manufacturing the component are determined 203. The operations employed may for example include roughing in which material is removed rapidly from the work piece (at the cost of lower precision), and finishing operations in which material is removed more slowly from the work piece so as to provide suitable precision and surface quality. Semi-finishing may also be employed as an intermediate operation between roughing and finishing. Suitable cutting tools for the respective operations are also determined (or selected) 204. An overall tool optimization 205 may be performed, including the selected machining operations 203 and the selected cutting tools 204. Cutting data such as feed rate, spindle speed and cutting depth are then determined (or selected) 206. Time and cost for manufacturing the component may then be estimated 207. Optimization 208 may be performed to determine (or select) suitable start values for the cutting data 206. Tool paths are then generated 209. A CAM simulation is performed 210 for the tool paths to predict potential collisions. Optimization software such as MACHPRO may then be employed for adjusting 211 the feed rate and spindle speed for the generated tool paths. Final estimates of manufacturing times and costs are then calculated 112. Components are then manufactured 213 using the machine, operations, tool paths and cutting data determined earlier. As described with reference to FIG. 1, post-processing 105 may be employed to convert machine-independent tool path data generated via CAM 103 into NC code 106 employed for controlling a particular machine to manufacture 213 the components. Quality evaluation 214 may be performed on the manufactured components. The quality evaluation may for example be performed by measuring shapes, dimensions and surface roughness of the components. Such measurements may for example be performed using a probe, or through an optical measurement device. Optical measurements may for example be performed by directing a light beam towards the component to be evaluated, and evaluating the component based on the intensity of light reflected by the component into a an optical sensor (such as a camera).

Figure 3:
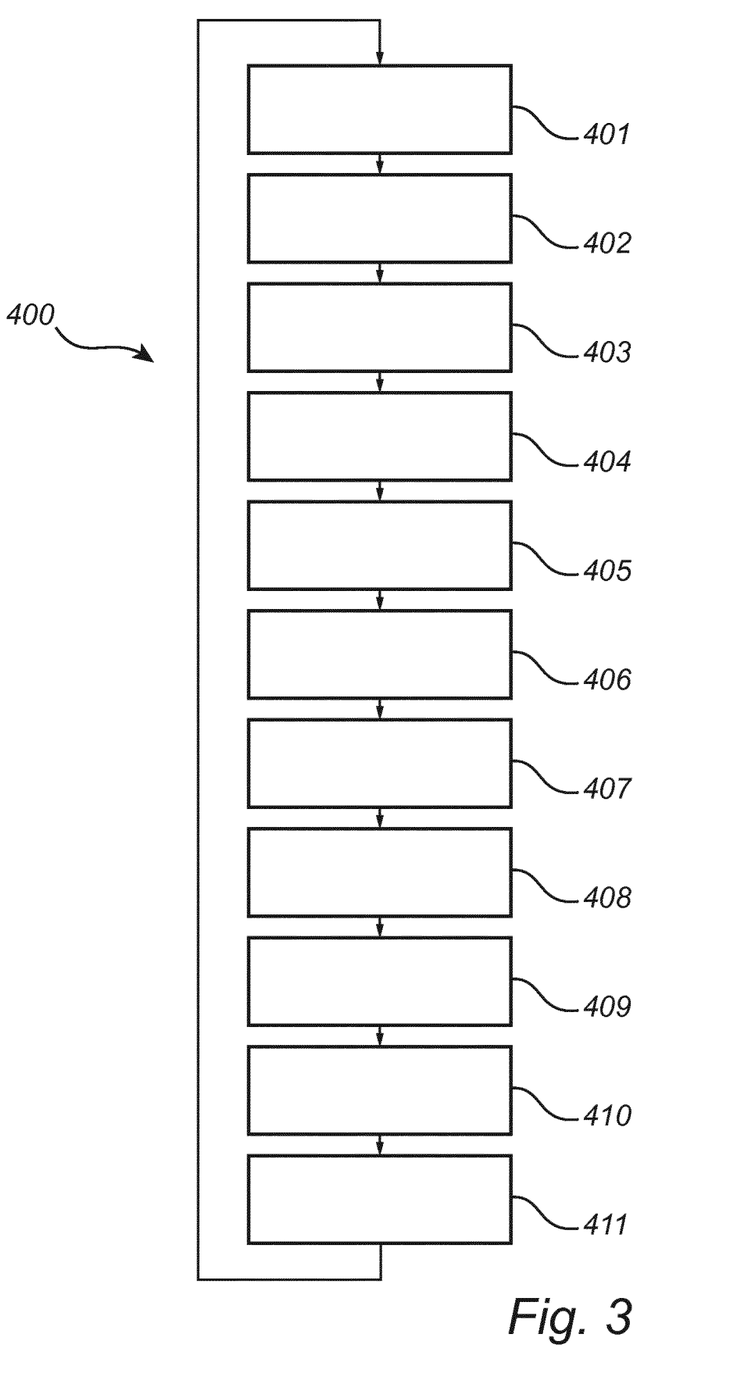
FIG. 3 is a flow chart of a method according to an embodiment.
Figure 4:
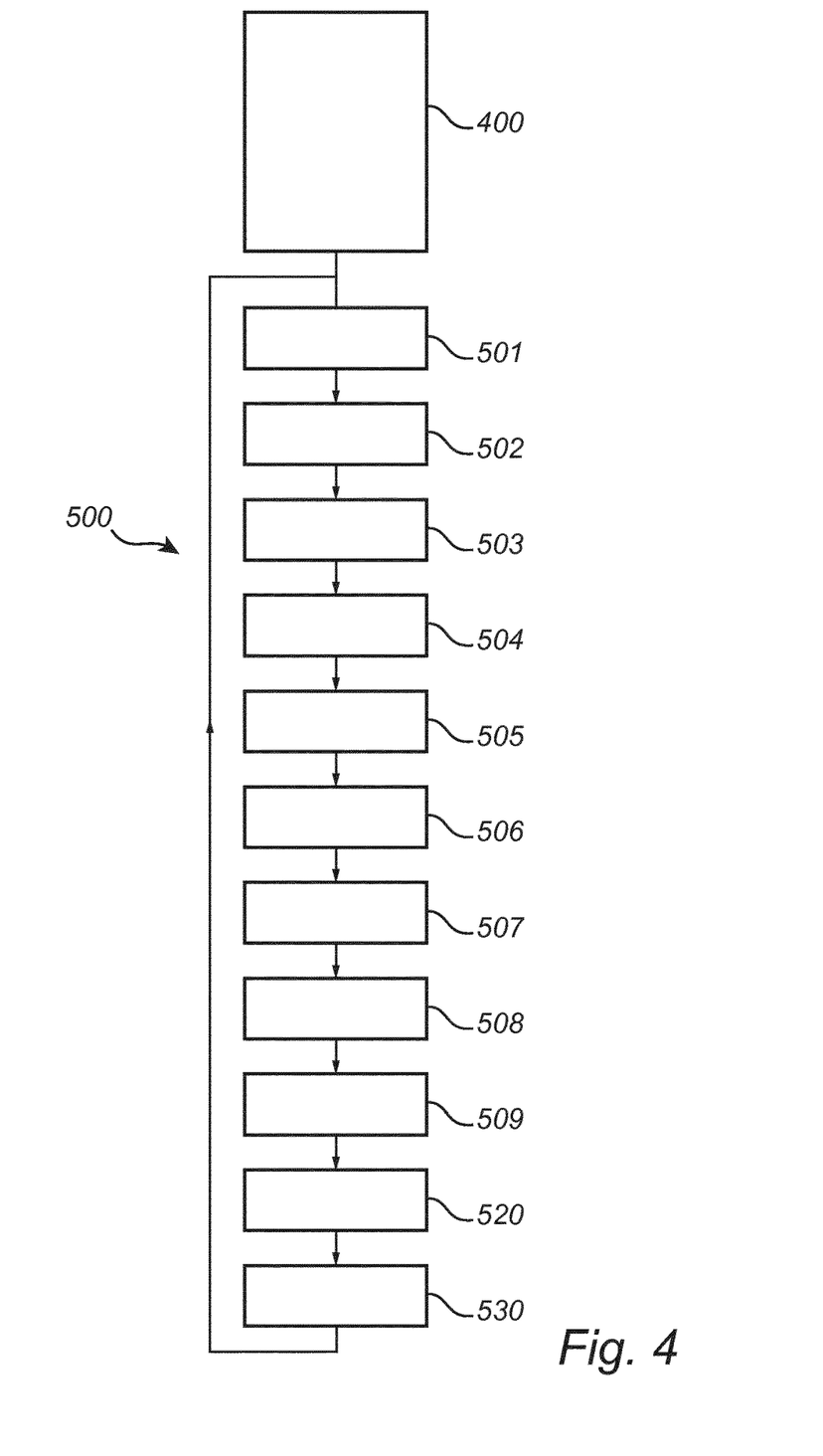
FIG. 4 is a flow chart of a method according to an embodiment.

As shown in FIG. 2, a system 300 may monitor certain of the steps 201-214 and may provide feedback to some of these steps 201-214. FIGS. 3 and 4 are flow charts of methods performed by the system 300, according to respective embodiments. Operation of the system 300 will be described below with reference to FIGS. 2-4.

FIG. 3 is a flow chart of a method 400 performed by the system 300, according to an embodiment. The method 400 forms a learning stage in which the system 300 employs empirical data from the process planning (or the pre-machining stage) and manufacturing (or the in-machining stage) of a number of components in order to predict how errors or deviations arising at the different stages affect the manufactured products.

In the method 400, a number of steps are repeated for of a plurality of components to be manufactured. In a first step 401, a 3D model of the component is obtained 401. As described with reference to FIG. 2, the 3D model may have been generated 201 at a computer as a CAD model. The system 300 may for example obtain 401 the CAD model from a compute in which it has been generated, or from a memory in which the model is stored. If multiple components are to be manufactured based on the same model, the model may for example be retrieved once, instead of once for each of the components.

A computer program for manufacture of the component is then obtained 402. In the present embodiment, the computer program is a computer program generated via CAM software based on the CAD model (like the computer program 104 described with reference to FIG. 1). The computer program, includes tool path data generated via CAM software and may for example be provided in the form of a file with extension .cl. The computer program may for example be received by the system 300 from a computer at which it is generated, or the computer program may be retrieved from a memory.

The method 400 comprises providing 403 a first estimated geometry by estimating, based on the computer program, a geometry of the component to be manufactured. The first estimated geometry may for example be estimated via the machining operations, tool paths, and cutting data defined by the computer program.

The method 400 comprises estimating 404 a deviation between the first estimated geometry and a geometry of the component as defined by the three-dimensional model. This type of deviation is referred to herein as a first type of deviation. There are many different ways to generate tool paths for manufacture of a component based on a 3D model of the component. The different decisions made when generating the tool paths (see for example the steps 201-213 described with reference to FIG. 2) leads to different deviations from the 3D-model.

The method 400 comprises obtaining 405 a post-processed version of the computer program. In the present embodiment, the post-processed version is provided in the form of NC code (like the prost-processed computer program 106 described with reference to FIG. 1). The post-processed version of the computer program may for example be received from a post-processing device at which it is generated, or may be retrieved from a memory.

The method 400 comprises providing 406 a second estimated geometry by estimating, based on the post-processed version of the computer program, a geometry of the component to be manufactured. The second estimated geometry may for example be estimated via the machining operations, tool paths, and cutting data defined by the post-processed version of the computer program.

The method 400 comprises estimating 407 a deviation between the first estimated geometry and the second estimated geometry. This type of deviation is referred to herein as a fourth type of deviation (the second and third types of deviation will be described below).

The method 400 comprises obtaining 408 sensor data captured at a machine during manufacturing of the component by the machine (where the manufacturing of the component is based on the post-processed version of the computer program, and is thereby based indirectly on the computer program).

The sensor data is indicated in FIG. 2 by the signal 301 from the machining step 213 to the system 300. The sensor data 301 may for example include positional feedback from a control system controlling the machine based on the processed version of the computer program. The sensor data 301 may also include force feedback from the machine (for example measured by a dynamometer). The control system of the machine may for example be a programmable logic controller (PLC). The PLC may control servos in the machine to cause a cutting tool to move relative to a work piece. Positional feedback from the control system (or PLC) may indicate actual positions of moving parts in the machine such as a spindle holding the cutting tool or the work piece. The post-processed computer program (for example in the form of NC code) may describe how the cutting tool is to move during machining. However, the PLC may be unable to cause the machine to provide those exact tool paths, for example due to physical limitations of the servos, high friction between certain moving parts, or loose contact (or play) between certain parts of the machine (such as at a spindle or in the tooling system).

The obtained sensor data 301 may for example include sensor data from sensors arranged at (or in) a cutting tool. The sensors may include an accelerometer, a strain gauge, and/or a temperature sensor. Sensor data from strain gauges may indicate that the cutting edge of the cutting tool is deflected and/or worn. Sensor data from accelerometers may indicate presence of vibrations at the cutting edge. Sensor data from a temperature sensor may indicate that the cutting tool has expanded due to high temperature. Such states of the machine may cause deviations between the intended cutting actions and the cutting actions actually provided, whereby the actually obtained component may have different geometry than expected.

The method 400 comprises estimating 409, based on machine process characteristics indicated by the sensor data, a deviation between a tool path the machine is instructed via the post processed version of computer program (and thereby indirectly via the computer program) to provide, and an actual tool path provided by the machine during the manufacturing of the component. This type of deviation is referred to herein as a second type of deviation.

The machine process characteristics may include deflection, vibration, temperature expansion of the cutting tool. The machine process characteristics may include that the PLC is not able to provide motion in the machine as instructed by the post-processed computer program provided to the PLC. The machine process characteristics may include wear at the cutting tool, tool breakage, or chip breakage (of a chip formed by material removed from the work piece during machining)

The method 400 comprises computing a deviation between the geometry of the component as defined by the 3D model and a measured actual geometry of the component as manufactured. This type of deviation is referred to herein as a third type of deviation.

The estimated and computed deviations for the respective components (i.e. the deviations of the first, second, third and fourth types) may be employed to approximate how the different types of deviations relate to each other. The method 400 therefore comprises updating 411 an error propagation model based on the estimated deviations and the computed deviations. The error propagation model may for example approximate a relation between the first and third types of deviations, a relation between the second and third types of deviations, and a relation between the fourth and third types of deviation. In other words, the error propagation model indicates how these types of deviations depend on each other.

The error propagation model may for example be employed to estimate deviation in a component as manufactured (i.e. a deviation of the third type) based on deviations arising during pre-machining (i.e. the first and fourth type of deviations) and deviatikns arising during in-machining (i.e. the second type of deviation). The error propagation model may for example be employed to identify a root cause of an error in the manufactured product.

The updating 411 of the error propagation model may be performed once for each manufactured component, or may be performed once emporical data from manufacture of several components is available.

Embodiments may also be envisaged in which a deviation between the shape of the component as defined the by the 3D model (for example the model 102 in FIG. 1) and a shape defined by the processed version of the computer program (for example the post-processed computer program 106 in FIG. 1) is estimated, and in which the error propagation model approximates a relation between this type of deviation and the third type of deviation, instead of between the first (or fourth) type of deviation and the third type of deviation.

After the learning stage described with reference to FIG. 3, the system 300 may continue in a steady state which will be described with reference to FIG. 4. FIG. 4 is a flow chart of a method 500 including the steady state method 400 described with reference to FIG. 3, as well as a steady state in which further components are manufactured.

Once the error propagation model has been updated based on sufficient amounts of empirical data (represented in FIG. 4 by the learning method 400 as a block at the beginning of the method 500), the method 500 continues by preparing manufacturing of a further components (which is also referred to herein as an additional component to distinguish it from the previously manufactured components).

The method 500 includes steps 501-509 which are analogous to the steps 401-409 of method 400, described above with reference to FIG. 3, but for the additional component. For example, the method 500 comprises estimating 504 a first type of deviation, estimating 507 a fourth type of deviation, and estimating 509 a second type of deviation.

Once the steps 501-509 have been performed, the method 500 continues by estimating 520, based on the error propagation model and based on the estimated deviations for the additional component (i.e. deviations of the first, second and fourth types), a deviation between the geometry of the additional component as defined by the 3D model of the additional component and an actual shape of the additional component as manufactured.

As the error propagation model allows the deviation between the geometry of the additional component as defined by the 3D model and an actual shape of the additional component as manufactured to be estimated, the need for measuring the actual shape of the component is reduced. The estimated deviations of the first, second and fourth types may for example be employed to predict whether the geometry (for example size, dimensions and/or surface roughness) of the final component will be within a tolerance. Hence, otherwise costly post-machining steps to evaluate the quality of manufactured components may be dispensed with. Estimated deviations between the geometry of components as defined by a 3D model and the actual shape of the components as manufactured may for example be employed to single out those components which need to be measured to determine whether they are within the tolerance, or to single out those components which do not need to be measured to conclude that they are within a tolerance.

Embodiments my also be envisaged in which measurements are still performed on the manufactured products in the steady state (i.e. after the learning stage provided b the method 400) to further update the error propagation model.

The method 500 may for example comprise providing 530 documentation, including the estimated deviations for the additional component, to be delivered together with the manufactured additional component. The documentation may allow a customer receiving the manufactured component to trace deviations or other conditions detected before or during manufacture of that particular component. Such traceability allows root causes of errors or deviations in the manufactured component to be more easily located.

In addition to learning how different types of deviations are related to each other, the system 300 may provide feedback to the pre-machining stages and/or in-machining stages described with reference to FIG. 2.

The method 400 (or the method 500) may for example comprise generating instructions, based on the updated error propagation model or based on the estimated deviations and the computed deviations. These instructions may be employed during the pre-machining phase to determine 203 suitable machining operations, to determine 204 suitable cutting tools, to determine 206 suitable cutting data, or when generating 209 suitable tool paths. In other words, the instructions may be employed as input in a process (such the CAM 103 described with reference to FIG. 1) for generating, based on a 3D model of a component, a computer program (such as the computer program 104 or the post processed computer program 106 described with reference to FIG. 1) for manufacturing of the component. Generation of such computer programs may be based on models of how cutting tools, cutting data etc. affect vibrations, chatter and/or forming of chips during machining. Learning obtained via the system 300 based on empirical data may for example be employed to update or modify such models.

This type of feedback is provided in a quite large time scale, where learning based on large amounts of empirical data is employed during pre-machining of components at a later point in time. The system 300 may for example receive data from multiple machines for speeding up the learning. The internet (or cloud based services) may be employed for gathering and/or processing these large amounts of data. Machine learning may for example be employed to distinguish patterns or correlations within this potentially very large data set. If data is received from multiple machines, metadata may be needed to keep track of where the data originates from (i.e. from which machine, and during which conditions it has been generated)

Feedback from the system 300 may for example be employed in one or more of the optimizations steps 205, 208 and 211.

The system 300 may also provide feedback on a shorter time scale, such as during machining of a component. The method 400 (or the method 500) may for example comprise generating, based on the sensor data 301 captured at a machine during manufacturing of a certain component by the machine, control signals for controlling the machine to adjust cutting data already during the manufacture of the certain component.

If vibrations or chatter are detected at the cutting tool, feed rate or spindle speed may for example be adjusted to reduce the vibrations or chatter. The feed rate or spindle speed may for example also be adjusted if high temperatures or wear are detected at the cutting tool during machining.

The method 400 (or the method 500) may for example comprise generating, based on the sensor data 301 captured at a machine during manufacturing of a certain component by the machine, instructions for controlling the machine to adjust cutting data for manufacture of a subsequent component. In other words, the system 300 may provide feedback to the machine to be used when manufacturing the next component.

The method 400 (or the method 500) may for example comprise updating, based on the updated error propagation model or based on the estimated deviations and the computed deviations, a rule for how sensor data captured at a machine during manufacture of a component by the machine is to be employed for control of the machine during manufacture. In other words, long term feedback from the error propagation model maintained by the system 300 may be employed to influence short term feed back during machining of a component.

Various types of models (for example statistical, numerical or mechanical models) may be employed for prediction and/or optimization of process parameters for the machining. Such models may be updated based on the updated error propagation model, which will then affect how process parameters are determined. This may be regarded as an example of how a rule for control of the machine during manufacture may be updated.

The learning provided by the system 300 may for example be employed to determine machine characteristics (which may be referred to as a machine fingerprint) with respect to machine condition, kinematic and dynamic behavior etc. for a given machine. Such characteristics may for example be included in documentation delivered together with the manufactured components.

The learning provided by the system 300 may for example be employed to determine cutting tool assembly characteristics (which may be referred to as a fingerprint) with respect to tool condition as well as static and dynamic behavior. Such characteristics may for example be included in documentation delivered together with the manufactured components.

The system 300 may for example be adapted to take into account input from an operator. An operator may for example provide manual feed back to the system 300 based on sensor data or measurements of the manufactured components.

The person skilled in the art realizes that the present invention is by no means limited to the preferred embodiments described above. On the contrary, many modifications and variations are possible within the scope of the appended claims. For example, the manufactured components need not be bladed discs (as in FIGS. 1 and 2). Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method comprising, for each of a plurality of components to be manufactured, the steps of:
    obtaining a three-dimensional model of a component to be manufactured;
    obtaining a computer program having computer executable code for manufacture of the component based on the three-dimensional model of a component, the computer program including data defining a tool path for a cutting tool;
    providing a first estimated geometry by estimating, based on the computer program, a geometry of the component to be manufactured;
    estimating a first type of deviation as a deviation between the first estimated geometry and a geometry of the component as defined by the three-dimensional model;
    obtaining sensor data captured at a machine during manufacturing of the component by the machine, wherein the manufacturing of the component is based on the computer program;
    estimating, based on machining process characteristics indicated by the sensor data, a second type of deviation as a deviation between a tool path the machine is instructed via said computer program to provide and an actual tool path provided by the machine during the manufacturing of the component;
    computing a deviation of a third type as a deviation between the geometry of the component as defined by the three-dimensional model and a measured actual geometry of the component as manufactured;
    updating an error propagation model based on the estimated deviations and the computed deviations, wherein the error propagation model approximates a relation between the first and third types of deviations, and a relation between the second and third types of deviations; and
    generating, based on the sensor data captured at a machine during manufacturing of a certain component by the machine, instructions for controlling the machine to adjust cutting data for manufacture of a subsequent component.

2. The method of claim 1, further comprising, for at least some of the plurality of components:
    obtaining a post-processed version of the computer program;
    providing a second estimated geometry by estimating, based on the post-processed version of the computer program, a geometry of the component to be manufactured; and
    estimating a fourth type of deviation as a deviation between the first estimated geometry and the second estimated geometry, wherein said second type of deviation is estimated, based on said machining process characteristics, as a deviation between a tool path the machine is instructed via the post-processed version of the computer program to provide and an actual tool path provided by the machine during the manufacturing of the component, wherein the error propagation model is updated also based on the estimated deviations of the fourth type, and wherein the error propagation model also approximates a relation between the fourth and third types of deviation.

3. The method of claim 1, wherein the obtained sensor data includes positional feedback from a control system controlling the machine based on the computer program.

4. The method of claim 1, wherein the obtained sensor data includes sensor data from a cutting tool, and wherein said machining process characteristics includes:
    deflection of the cutting tool;
    vibration of the cutting tool;
    temperature expansion of the cutting tool;
    wear;
    tool breakage; and/or
    chip breakage.

5. The method of claim 1, wherein the obtained sensor data includes sensor data from other parts of the machine than the cutting tool, and wherein said machining process characteristics include:
    a loose connection between parts of the machine; and/or
    a certain level of friction for a movable part of the machine.

6. The method of claim 1, wherein the obtained sensor data includes data from:
    a dynamic force measurement sensor;
    a force measurement sensor;
    a torque measurement sensor;
    a temperature sensor;
    a dimensional measurement sensor;
    a surface roughness measurement sensor;
    a positioning sensor;
    an inductive sensor; and/or
    an optical sensor.

7. The method of claim 1, further comprising generating instructions, based on the updated error propagation model or based on the estimated deviations and the computed deviations, for selection of:
    a machining operation, a machining operation sequence;
a cutting tool,
a tool assembly;
a tool path; and/or
cutting data, in a process for generating, based on a three-dimensional model of a component, a computer program for manufacturing of the component.

8. The method of claim 1, further comprising updating, based on the updated error propagation model or based on the estimated deviations and the computed deviations, a rule for how sensor data captured at a machine during manufacture of a component by the machine is to be employed for control of the machine during manufacture.

9. A computer program product having computer executable code comprising a non-transitory computer-readable medium, which when executed by a computer causes a system to perform the method of claim 1.

10. A system configured to perform the method as defined in claim 1.

11. A method of comprising, for each of a plurality of components to be manufactured, the steps of:
obtaining a three-dimensional model of a component to be manufactured;
obtaining a computer program having computer executable code for manufacture of the component based on the three-dimensional model of a component, the computer program including data defining a tool path for a cutting tool;
providing a first estimated geometry by estimating, based on the computer program, a geometry of the component to be manufactured;
estimating a first type of deviation as a deviation between the first estimated geometry and a geometry of the component as defined by the three-dimensional model;
obtaining sensor data captured at a machine during manufacturing of the component by the machine, wherein the manufacturing of the component is based on the computer program;
estimating, based on machining process characteristics indicated by the sensor data, a second type of deviation as a deviation between a tool path the machine is instructed via said computer program to provide and an actual tool path provided by the machine during the manufacturing of the component;
computing a deviation of a third type as a deviation between the geometry of the component as defined by the three-dimensional model and a measured actual geometry of the component as manufactured;
updating an error propagation model based on the estimated deviations and the computed deviations, wherein the error propagation model approximates a relation between the first and third types of deviations, and a relation between the second and third types of deviations;
obtaining a three-dimensional model of an additional component to be manufactured;
obtaining a computer program for manufacture of the additional component, the computer program including data defining a tool path for a cutting tool;
providing an estimated geometry of the additional component by estimating, based on the computer program, a geometry of the additional component to be manufactured;
estimating a first type of deviation between the estimated geometry of the additional component and a geometry of the additional component as defined by the three-dimensional model of the additional component;

obtaining additional sensor data captured at a machine during manufacture of the additional component by the machine, wherein the additional component is manufactured by the machine based on the computer program;
estimating, based on machining process characteristics indicated by the additional sensor data, a second type of deviation as a deviation between a tool path the machine is instructed via the computer program to provide and an actual tool path provided by the machine during manufacture of the additional component; and
estimating, based on the error propagation model and based on the estimated deviations for the additional component, a deviation between the geometry of the additional component as defined by the three-dimensional model and an actual shape of the additional component as manufactured.

12. A method of comprising, for each of a plurality of components to be manufactured, the steps of:
obtaining a three-dimensional model of a component to be manufactured;
obtaining a computer program having computer executable code for manufacture of the component based on the three-dimensional model of a component, the computer program including data defining a tool path for a cutting tool;
providing a first estimated geometry by estimating, based on the computer program, a geometry of the component to be manufactured;
estimating a first type of deviation as a deviation between the first estimated geometry and a geometry of the component as defined by the three-dimensional model;
obtaining sensor data captured at a machine during manufacturing of the component by the machine, wherein the manufacturing of the component is based on the computer program;
estimating, based on machining process characteristics indicated by the sensor data, a second type of deviation as a deviation between a tool path the machine is instructed via said computer program to provide and an actual tool path provided by the machine during the manufacturing of the component;
computing a deviation of a third type as a deviation between the geometry of the component as defined by the three-dimensional model and a measured actual geometry of the component as manufactured;
updating an error propagation model based on the estimated deviations and the computed deviations, wherein the error propagation model approximates a relation between the first and third types of deviations, and a relation between the second and third types of deviations;
obtaining a three-dimensional model of an additional component to be manufactured;
obtaining a computer program for manufacture of the additional component, the computer program including data defining a tool path for a cutting tool;
providing an estimated geometry of the additional component by estimating, based on the computer program, a geometry of the additional component to be manufactured;
estimating a first type of deviation between the estimated geometry of the additional component and a geometry of the additional component as defined by the three-dimensional model of the additional component;

obtaining additional sensor data captured at a machine during manufacture of the additional component by the machine, wherein the additional component is manufactured by the machine based on the computer program;

estimating, based on a machining process characteristic indicated by the additional sensor data, a second type of deviation as a deviation between a tool path the machine is instructed via the computer program to provide and an actual tool path provided by the machine during manufacture of the additional component; and providing documentation, including the estimated deviations for the additional component, for delivery together with the additional component.

13. A method comprising, for each of a plurality of components to be manufactured, the steps of:

obtaining a three-dimensional model of a component to be manufactured;

obtaining a computer program having computer executable code for manufacture of the component based on the three-dimensional model of a component, the computer program including data defining a tool path for a cutting tool;

providing a first estimated geometry by estimating, based on the computer program, a geometry of the component to be manufactured;

estimating a first type of deviation as a deviation between the first estimated geometry and a geometry of the component as defined by the three-dimensional model;

obtaining sensor data captured at a machine during manufacturing of the component by the machine, wherein the manufacturing of the component is based on the computer program;

estimating, based on machining process characteristics indicated by the sensor data, a second type of deviation as a deviation between a tool path the machine is instructed via said computer program to provide and an actual tool path provided by the machine during the manufacturing of the component;

computing a deviation of a third type as a deviation between the geometry of the component as defined by the three-dimensional model and a measured actual geometry of the component as manufactured;

updating an error propagation model based on the estimated deviations and the computed deviations, wherein the error propagation model approximates a relation between the first and third types of deviations, and a relation between the second and third types of deviations; and generating, based on the sensor data captured at a machine during manufacturing of a certain component by the machine, control signals for controlling the machine to adjust cutting data already during the manufacture of the certain component.

* * * * *